W. TREWHELLA.
ROLLER GRIP FOR BAND GEARING.
APPLICATION FILED NOV. 2, 1908.
952,156.
Patented Mar. 15, 1910.
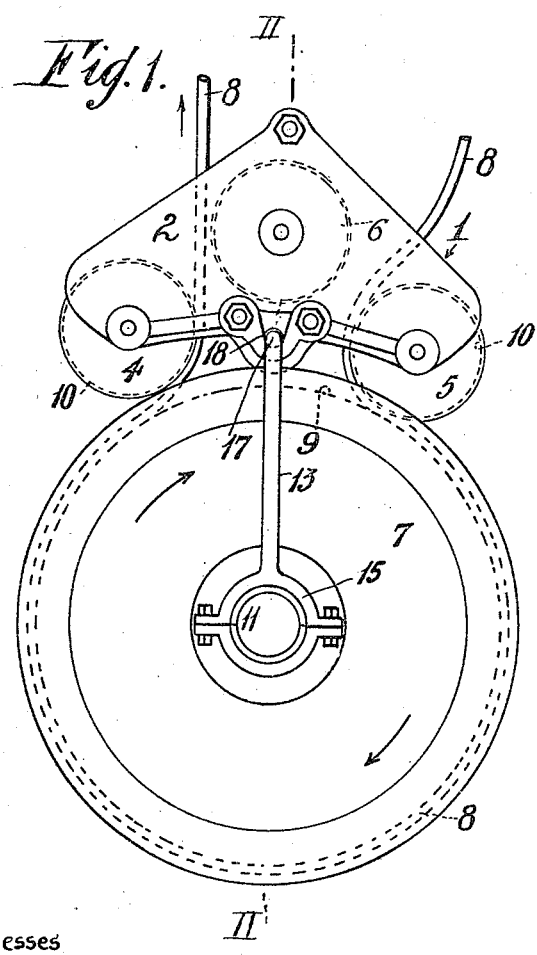
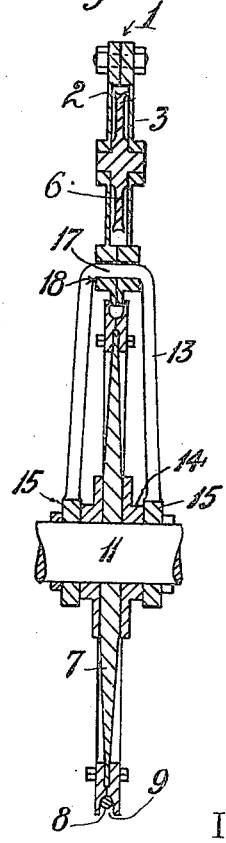
Witnesses
Jesse N. Sutton.
B. Sommers
Inventor
William Trewhella
By Henry Orth
Attorneys

UNITED STATES PATENT OFFICE.

WILLIAM TREWHELLA, OF TRENTHAM, VICTORIA, AUSTRALIA, ASSIGNOR TO HIMSELF AND BENJAMIN TREWHELLA, OF TRENTHAM, AUSTRALIA.

ROLLER-GRIP FOR BAND-GEARING.

952,156.   Specification of Letters Patent.   Patented Mar. 15, 1910.

Application filed November 2, 1908.  Serial No. 460,702.

*To all whom it may concern:*

Be it known that I, WILLIAM TREWHELLA, a subject of the King of Great Britain, residing at Trentham, in the State of Victoria, Australia, have invented an Improved Roller-Grip for Band-Gearing, of which the following is a specification.

This invention relates to means for gripping flexible driving or power transmitting connection to the pulley or pulleys around which they may pass. Such flexible driving or power transmitting connections may be termed generally bands, and this expression shall be taken as including belts, ropes, wires, cords and the like.

This improved roller grip for band gearing comprises a device capable of use in frictional transmission of power for obtaining a grip of a band upon a wheel or pulley. Unlike weighted or spring jockey pulleys used for somewhat similar purposes and having a uniform strain the power of the frictional grip varies in proportion to the strain on the band so that there is less friction and the life of the band is lengthened due to the diminished amount of wear. The device moreover operates exactly in the same manner when the motive power is transmitted in a reverse direction, and it acts equally well when either the band or the pulley is the operating element. It is useful in producing a good grip, in gripping a haulage rope to the operating pulley, or gripping a pulley to a traveling rope where either an endless or double ended rope is employed. The device is therefore applicable to winches, or for the ropes of haulage mechanism, such as jacks, employed for grubbing or uprooting tree stumps or removing logs or other weighty objects.

In the accompanying drawing illustrating the invention, Figure 1 is a side elevation of the device as applied to a haulage rope and pulley and Fig. 2 is a vertical section on line II—II of Fig. 1.

The device comprises a rockable lever 1 preferably formed of two guide plates 2, 3 bolted together and spaced apart and provided at each end with a gripping roller or pulley 4, 5, journaled between said plates. An auxiliary roller 6 is mounted between the gripping roller 4, 5 and is preferably but not necessarily journaled between the plates 2, 3. The lever is located close to the periphery of the rotatable element, as for instance, a pulley or wheel 7 and is preferably pivoted upon a radial arm 13 which is pivoted at one end on the axle 11 of the pulley or on the boss 14 of the pulley as desired. In either case the gripping device may swing around in any direction where the object to be operated upon by the haulage rope is located. The arm 13 may be in the form of a yoke with its ends 15, 15 loosely mounted on the axle while its looped part 17 passes over the pulley and through an eye 18 formed in the lever 1 intermediate the rollers and preferably midway between them. The band 8 passes around the pulley 7 between it and the gripping rollers 4, 5 and on each side of the auxiliary roller 6.

When the device is used with a groove pulley and a rope or cable the gripping rollers are preferably formed with peripheral grooves 10 shaped to suit the rope or cable and the gripping roller when in operation preferably enters the groove of the pulley.

Assuming the tension of the band 8 to be in the direction indicated by the arrows the roller 5 grips the slack portion of the rope between it and the pulley while the roller 4 bearing against the tension portion of the rope is free of the pulley but by reversing the direction of movement of the rope the device tilts in the opposite direction, when the roller 4 is brought into operation and the grip of the roller 5 is released.

Assuming that the pulley 7 were the operating element and rotating in the direction of the arrows the roller 4 would be gripping and the roller 5 free. In this case the tension of the rope would be in the opposite direction to that indicated, and moreover when the pulley is rotated in the opposite direction the roller 5 will be gripping the slack portion as indicated.

When one end of the band or haulage rope is free and the other end is put under tension the lever would, were it not for the auxiliary roller 6, swing around the pulley to such an extent that the roller engaging said tension portion would not press the other roller against the pulley. The function of the auxiliary roller 6, which is also preferably grooved, is to prevent this. Assuming that a pull is exerted on the band in the direction of the upper arrow, the lever would swing to the left from the position shown in Fig. 1 and the roller 6 would automatically be brought into contact with the running off portion of the band. Said roller will then serve as a fulcrum for the band, the roller 4 as a load and the band will act as a lever to force the roller 5 and with it the running on portion of the band against the pulley.

It will be apparent that when there is little or no tension on the band the friction and wear of the same will be reduced to a minimum.

I claim:—

1. The combination with a pulley and a band passing around the same, a gripping device comprising a rockable member situated close to the periphery of the pulley and movable around the latter and a gripping member in each end of the rockable member, of an auxiliary member adapted to engage the band to operate the gripping members.

2. The combination with a pulley, a band passing around the same, a radial arm pivotally connected with the pulley, a lever pivoted on said arm and a gripping roller on each end of the lever, of a roller situated between the running on and running off portion of the band.

3. The combination with a pulley, a band passing around the same, a radial arm pivotally connected with the pulley, a lever pivoted on said arm and a gripping roller on each end of said lever, of a roller journaled in the lever between the gripping rollers.

In testimony whereof I have hereunto set my hand in presence of two subscribing witnesses.

WILLIAM TREWHELLA.

Witnesses:
  WILLIAM HERBERT WATERS,
  WILLIAM GUEST HOLDEN.